US006931847B1

(12) United States Patent
Throckmorton et al.

(10) Patent No.: US 6,931,847 B1
(45) Date of Patent: Aug. 23, 2005

(54) FLOW SHARING PRIORITY CIRCUIT FOR OPEN CIRCUIT SYSTEMS WITH SEVERAL ACTUATORS PER PUMP

(75) Inventors: Charles D. Throckmorton, Ames, IA (US); Michael D. Gandrud, Ames, IA (US); Jimmy W. Bolinger, Ames, IA (US)

(73) Assignee: Sauer-Danfoss, Inc., Ames, IA (US)

( * ) Notice: Subject to any disclaimer, the term of this patent is extended or adjusted under 35 U.S.C. 154(b) by 12 days.

(21) Appl. No.: 10/793,597

(22) Filed: Mar. 4, 2004

(51) Int. Cl.[7] .............................................. F16D 31/02
(52) U.S. Cl. .......................................... 60/422; 91/516
(58) Field of Search .......................... 60/420, 422, 484; 91/514, 516

(56) References Cited

U.S. PATENT DOCUMENTS 4,043,419 A 8/1977 Larson, et al.
4,345,614 A 8/1982 Karlberg et al.
4,993,447 A 2/1991 Camire
5,460,001 A * 10/1995 Kato et al. ..................... 60/426
5,549,361 A 8/1996 Sorensen
5,937,645 A * 8/1999 Hamamoto .................. 60/422
6,367,365 B1 * 4/2002 Weickert et al. .............. 60/422

* cited by examiner

*Primary Examiner*—Thomas E. Lazo

(57) ABSTRACT

A priority circuit is provided that is in communication with an open circuit pump and priority and auxiliary systems. The circuit comprises a first valve with an inlet in communication with the pump, an outlet in communication the priority system, and a load sensing inlet in communication with the priority system, wherein the first valve modulates to maintain a predetermined pressure differential between pressure at the load sensing inlet and pressure at the outlet. The circuit further comprises a second valve with an inlet in communication with the pump, an outlet in communication with the auxiliary system, and a load sensing inlet in communication with the priority system, wherein the second valve is normally closed and opens when pressure at the load sensing inlet of the second valve is less than pressure at the inlet of the second valve minus the predetermined pressure differential of the first valve.

7 Claims, 2 Drawing Sheets

FLOW SHARING PRIORITY CIRCUIT FOR OPEN CIRCUIT SYSTEMS WITH SEVERAL ACTUATORS PER PUMP

BACKGROUND OF THE INVENTION

The present invention relates to an open circuit hydraulic system and, more specifically, a flow sharing priority circuit for an open circuit hydraulic system.

Open circuit hydraulic systems are commonly used to drive a plurality of subsystems attached thereto. For example, an open circuit hydraulic system provided on heavy machinery may be used to drive the steering system, the fan motor, and a plurality of other components of the heavy machinery.

Open circuit hydraulic systems typically use priority valves to ensure that certain subsystems receive adequate hydraulic flow from the open circuit hydraulic pump. For instance, in an open circuit hydraulic system driving a critical system, such as a steering system, and a plurality of non-critical auxiliary systems, a priority valve may be used to ensure that the flow requirements of the critical system are satisfied before supplying hydraulic flow to the auxiliary systems. As such, priority valves ensure that the auxiliary systems do not starve off hydraulic flow from a critical system should the open circuit pump not be able to meet all of the demands of the system.

One disadvantage of conventional priority valves is that they tend to experience some undesired shift with changes in flow between the priority and auxiliary systems. Typical priority valve designs comprise a single spool or valve actuating element. It is inherent in this design that the valve spool will tend to shift when excess flow is provided from the priority system to the auxiliary system, resulting in undesired changes in the pressure and flow to the priority system. For instance, in an open circuit system driving a priority steering system and an auxiliary fan motor, a user will notice a small undesired jerk in the machine's steering wheel as the fan motor turns on or off.

It is therefore a principal object of this invention to provide a priority valve that prevents undesired changes in the pressure and flow of the priority system upon activation or deactivation of the auxiliary system.

A further object of this invention is to provide a flow sharing priority circuit that utilizes two independent priority valves.

These and other objects will be apparent to those skilled in the art.

BRIEF SUMMARY OF THE INVENTION

The present invention is directed towards a flow sharing priority circuit in fluid communication with an open circuit hydraulic pump, a priority system, and auxiliary systems. The priority circuit comprises a first valve with an inlet in fluid communication with the open circuit hydraulic pump, an outlet in fluid communication with the priority system, and a load sensing inlet in fluid communication with the priority system, wherein the first valve is normally open and modulates between open and closed positions to maintain a predetermined pressure differential between pressure at the load sensing inlet and pressure at the outlet.

The priority circuit further comprises a second valve with an inlet in fluid communication with the open circuit hydraulic pump, an outlet in fluid communication with the auxiliary systems, and a load sensing inlet in fluid communication with the priority system, wherein the second valve is normally closed and opens when pressure at the load sensing inlet of the second valve is less than pressure at the inlet of the second valve minus the predetermined pressure differential of the first valve.

Because this flow sharing priority circuit uses two independent priority valves, pressure and flow provided to the priority system does not fluctuate as excess flow is directed to the auxiliary system.

DESCRIPTION OF THE PREFERRED EMBODIMENTS OF THE INVENTION

Figure 1:
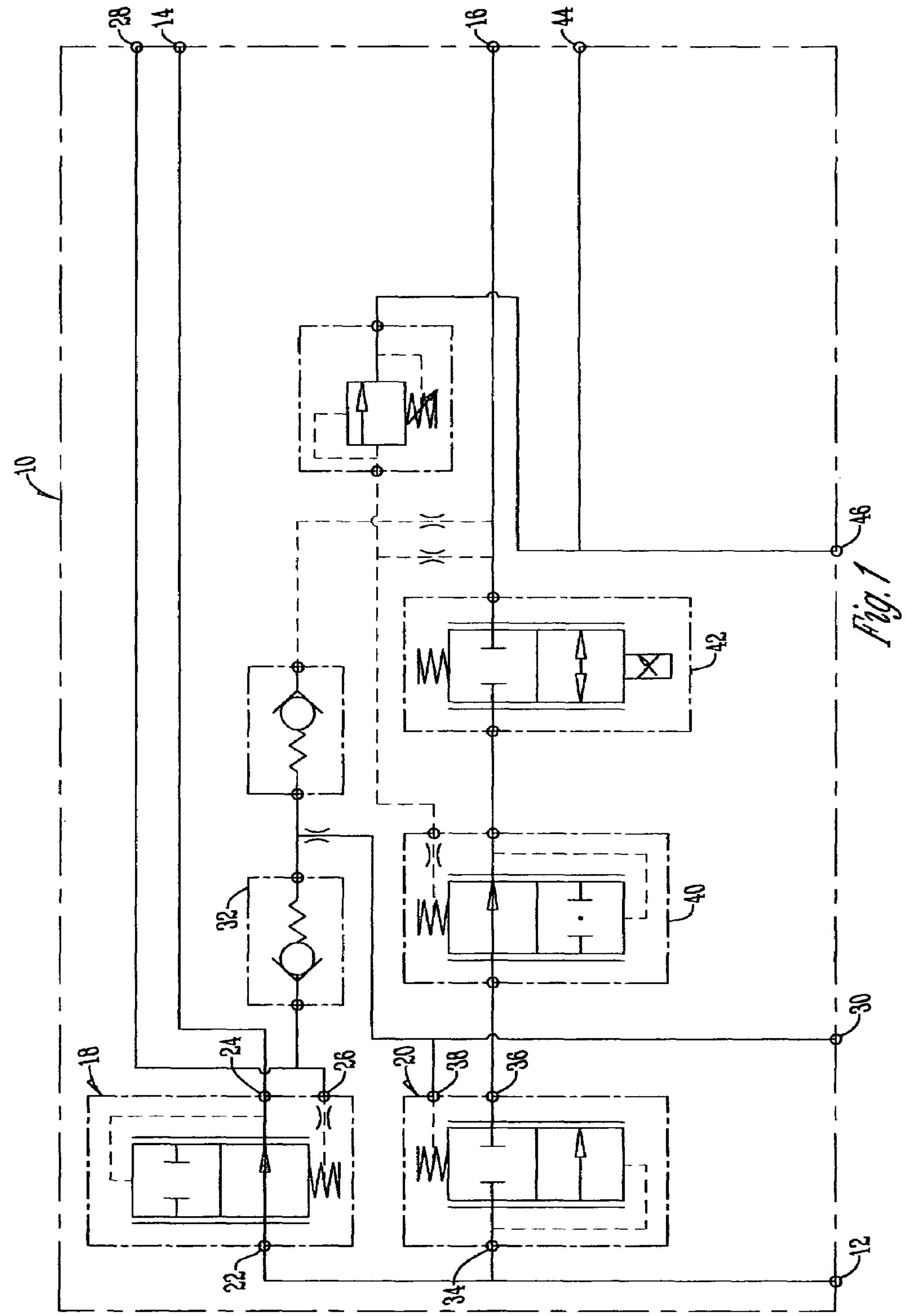
FIG. 1 is a schematic for an open circuit priority system of the present invention adapted for use with two loads.

With reference to FIG. 1, a flow sharing priority circuit 10 is shown with an open circuit pump port 12, a priority system port 14, an auxiliary system port 16, a first priority valve 18, and a second priority valve 20.

Pump port 12 is connected to the outlet of an open circuit pump (not shown), such as a pressure-compensated, load-sensing axial piston pump. Priority system port 14 is connected to a priority system (not shown), such as a steering system or other critical subsystem driven by the open circuit pump. Auxiliary system port 16 is connected to an auxiliary system (not shown), such as a fan motor or other non-critical subsystem driven by the open circuit pump.

The flow sharing circuit 10 uses a combination of valves 18 and 20 to replace a conventional priority valve of the single spool design. Valves 18 and 20 are hydraulic differential sensing valves. First valve 18 includes an inlet 22 in fluid communication with the open circuit pump port 12 and an outlet 24 in fluid communication with the priority system port 14. First valve 18 further includes a load sensing inlet 26 in fluid communication with a load sensing orifice which is provided externally and connected to 28 of priority system 14. First valve 18 is normally open such that pressure from the open circuit pump is supplied directly to the priority system. However, first valve 18 limits the flow provided to the priority system when the pressure demanded at the auxiliary system port 16 is greater than the pressure demanded at the priority system port 14. As first valve 18 is a differential sensing valve, valve 18 modulates between an open and closed position in order to maintain a predetermined pressure differential between the pressure at the load sensing inlet 26 and the outlet 24. Valve 18 is capable of providing a differential pressure setting within the range of 20 to 360 PSI. In most heavy machinery, a differential pressure setting of 80 PSI provides optimal performance conditions.

A check valve 32 is located between valves 18 and 20. When the pressure at the load sensing inlet 26 of valve 18 exceeds the pressure at load sensing inlet 30 of the open circuit pump, check valve 32 opens to permit fluid communication with second valve 20. Check valve 32 is configured to allow for the passage of small flows of load sensing fluid with minimal backpressure. This is accomplished by equipping check valve 32 with a low backpressure spring or by eliminating the spring entirely.

Second valve 20 is normally closed and includes an inlet 34 in fluid communication with the open circuit pump port 12 and an outlet 36 in fluid communication with the auxiliary system port 16. Second valve 20 further includes a load sensing inlet 38 in fluid communication with load sensing inlet 26 of first valve 18 and, therefore, in fluid communication with the load sensing orifice 28 of priority system 14. When the pressure at load sensing inlet 38 is less than the pressure at inlet 34 minus the differential pressure setting of first valve 18, second valve 20 shifts to an open position to provide excess flow from the open circuit pump to the auxiliary system at port 16. In this way, valves 18 and 20 function as a priority circuit.

As excess fluid is directed to the auxiliary system at port 16, the fluid passes through valves 40 and 42. Valve 42, which is an electronic proportional solenoid valve, is used to regulate the flow of hydraulic fluid that is supplied to the auxiliary system. Valve 40, which is a differential sensing valve similar to valves 18 and 20, works to modulate the pressure drop across valve 42. Valve 40 is capable of providing a differential pressure setting within the range of 20 to 360 PSI. In most heavy machinery, a differential pressure setting of 80 PSI provides optimal performance conditions. Excess flow that is supplied to the auxiliary system at port 16 is returned to the flow sharing priority circuit 10 at port 44. This return flow is directed to a drain port 46, which returns the hydraulic fluid to the open circuit pump or to the hydraulic reservoir.

Figure 2:
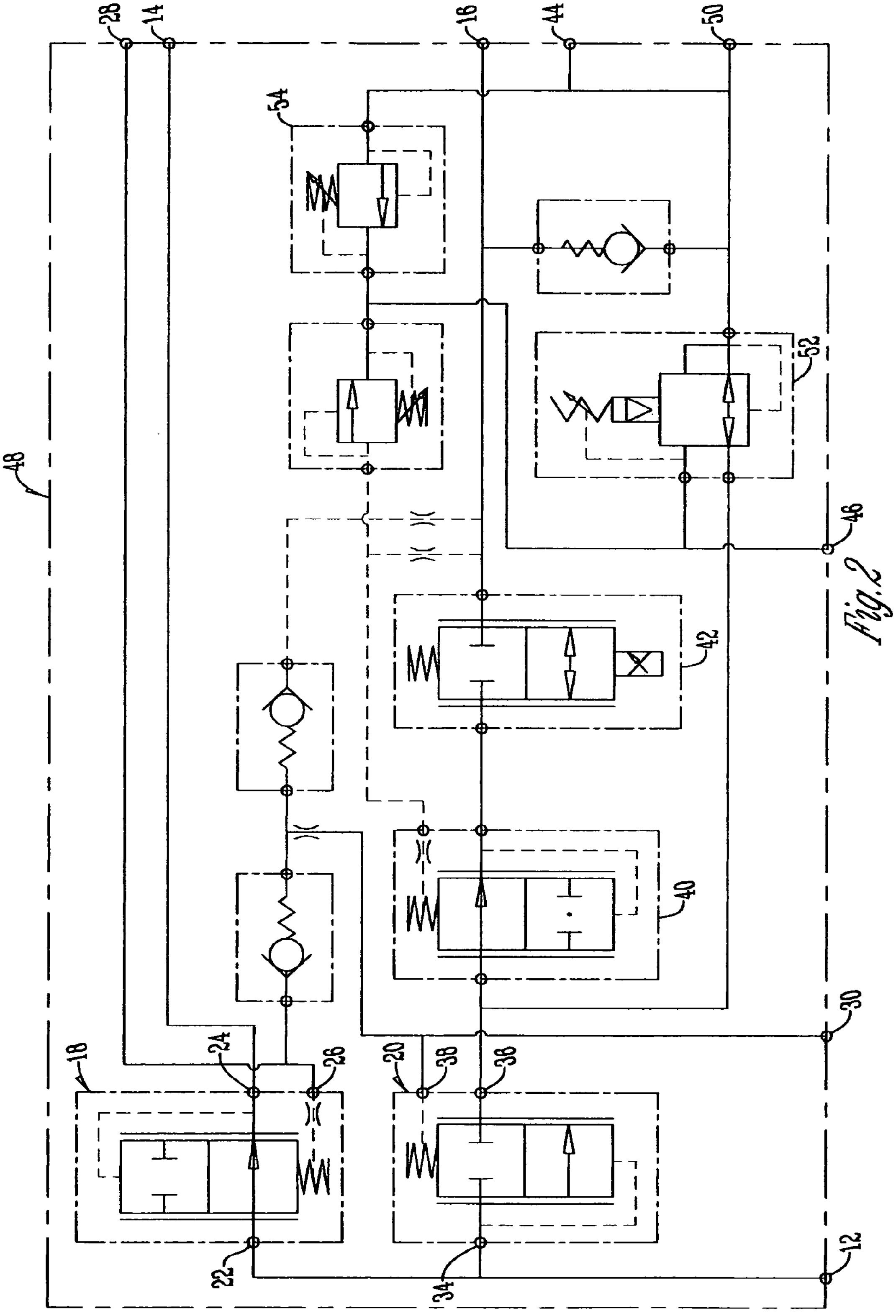
FIG. 2 is a schematic for an open circuit priority system of the present invention adapted for use with three loads.

Alternatively, the excess flow may be directed to a closed loop hydraulic system. As shown in FIG. 2, alternative flow sharing priority circuit 48 provides excess flow to the auxiliary system at port 16 as well as to the charge circuit of a closed loop hydraulic system (not shown) at port 50. Flow to the charge circuit at port 50 is initially provided by the flow returning from the auxiliary system to the flow sharing circuit 48 at port 44. When the pressure at port 50 is less than the requirements of the charge circuit, reducing valve 52 opens to allow excess flow to be provided directly to port 50. Reducing valve 52 is in fluid communication with the outlet 36 of valve 20 and port 50 of the close loop hydraulic system. Reducing valve 52 also is in fluid communication with the drain 46 as a pressure reference. Alternative flow sharing circuit 48 is further provided with a pressure relief valve 54. When the return pressure at port 44 exceeds the requirements of the charge circuit at port 50, relief valve 54 opens to vent the surplus pressure to the drain at port 46. Alternative flow sharing circuit 48 provides for greater efficiency as the return flow at port 44 is directed to the charge circuit of a closed loop hydraulic circuit at port 50 as opposed to being sent to the drain at port 46 and returned directly to the open circuit pump.

It is therefore seen that by the use of two independent priority valves in a flow sharing configuration, this invention permits the activation and deactivation of an auxiliary system without undesired changes in the pressure and flow of the priority system.

What is claimed is:

1. A flow sharing priority circuit in fluid communication with an open circuit hydraulic pump, a priority system, and an auxiliary system, the priority circuit comprising:

a first valve with an inlet in fluid communication with the open circuit hydraulic pump, an outlet in fluid communication with the priority system, and a load sensing inlet in fluid communication with the priority system, wherein the first valve is normally open and modulates between open and closed positions to maintain a predetermined pressure differential between pressure at the load sensing inlet and pressure at the outlet; and a second valve with an inlet in fluid communication with the open circuit hydraulic pump, an outlet in fluid communication with the auxiliary system, and a load sensing inlet in fluid communication with the priority system, wherein the second valve is normally closed and opens when pressure at the load sensing inlet of the second valve is less than pressure at the inlet of the second valve minus the predetermined pressure differential of the first valve.

2. The priority circuit of claim 1 further comprising a check valve in fluid communication with the load sensing inlet of the first valve and the load sensing inlet of the second valve.

3. The priority circuit of claim 1 further comprising a third valve in fluid communication with the outlet of the second valve and the auxiliary system wherein the third valve is normally open and modulates between open and closed positions to maintain a predetermined pressure differential.

4. The priority circuit of claim 1 wherein the outlet of the second valve also is in fluid communication with a charge circuit of a closed loop hydraulic system.

5. The priority circuit of claim 1 wherein the priority system is a hydraulic steering system.

6. The priority circuit of claim 1 wherein the auxiliary system is a hydraulic fan motor.

7. The priority circuit of claim 1 wherein the first and second valves are of the hydraulic differential sensing type.

* * * * *